United States Patent [19]

Weber

[11] Patent Number: 4,495,477
[45] Date of Patent: Jan. 22, 1985

[54] MULTIPLE AMPLITUDE AND PHASE SHIFT KEYED SIGNAL MODULATION METHOD

[75] Inventor: Herbert Weber, Backnang, Fed. Rep. of Germany

[73] Assignee: Licentia Patent-Verwaltungs-GmbH, Frankfurt am Main, Fed. Rep. of Germany

[21] Appl. No.: 372,386

[22] Filed: Apr. 27, 1982

[30] Foreign Application Priority Data

Apr. 30, 1981 [DE] Fed. Rep. of Germany ....... 3117134

[51] Int. Cl.$^3$ .................... H03C 5/00; H04L 27/20
[52] U.S. Cl. .................................... 332/10; 332/17; 332/22; 332/23 R; 332/9 R; 375/42; 375/53
[58] Field of Search .................. 332/9 R, 10, 17, 21, 332/22, 23 R, 40, 41, 42, 48, 23; 375/42, 53, 56, 57, 67

[56] References Cited

U.S. PATENT DOCUMENTS

| 3,706,945 | 12/1972 | Yanagidaira et al. | |
|---|---|---|---|
| 3,805,191 | 4/1974 | Kawai et al. | |
| 3,845,412 | 10/1974 | Rearwin et al. | 375/42 X |
| 3,983,485 | 9/1976 | Stuart | |
| 4,404,532 | 9/1983 | Welti | 375/86 X |

FOREIGN PATENT DOCUMENTS 2206382 8/1974 Fed. Rep. of Germany .

OTHER PUBLICATIONS

Miyauchi, K. et al., "New Technique for Generating and Detecting Multilevel Signal Formats" IEEE Transactions on Communications V.Com-24, No. 2, pp. 263-267 (Feb. 76).

Simon et al., "Hexagonal Multiple Phase-and-Amplitude-Shift-Keyed Signal Sets" IEEE Transactions on Communications, vol. COM-21, No. 10, 10/73, pp. 110-111.

Primary Examiner—Eugene R. LaRoche
Assistant Examiner—W. R. Paxman
Attorney, Agent, or Firm—Spencer & Frank

[57] ABSTRACT

In a multi-phase modulation method in which digital words each having a word length of at least 3 bits control the generation of a modulated carrier in a manner such that each digital word value is associated with a particular amplitude and phase of the modulated carrier, and in which the modulated carrier is formed of a combination of three oscillating signals having identical frequencies, shifted in phase by 120° relative to one another, and each having a selected amplitude, the digital words are associated with the oscillating signals in such a manner that a first group of digital words is represented only by modulated carrier phases which possess equal angular spacings in the 360° phase plane and a plurality of further digital words is represented by a zero amplitude carrier formed by combining all three oscillating signals each having the identical selected amplitude or by suppressing all three oscillating signals.

4 Claims, 6 Drawing Figures

| DS | MS |
|---|---|
| 1 0 0 | 1 |
| 1 1 0 | 2 |
| 0 1 0 | 3 |
| 0 1 1 | 4 |
| 0 0 1 | 5 |
| 1 0 1 | 6 |
| 0 0 0 | 7 |
| 1 1 1 | 8 |

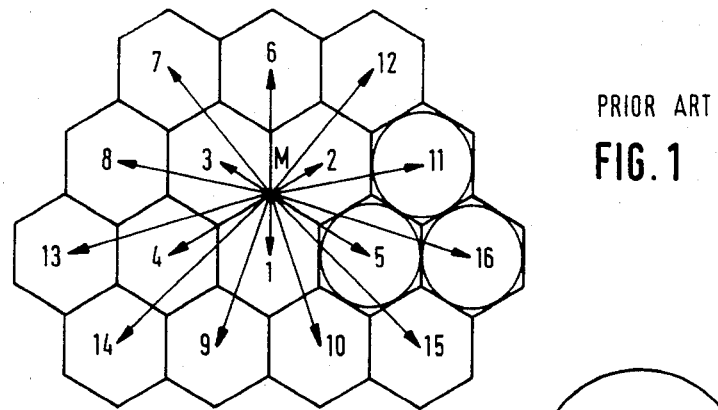
PRIOR ART
FIG. 1
FIG. 2
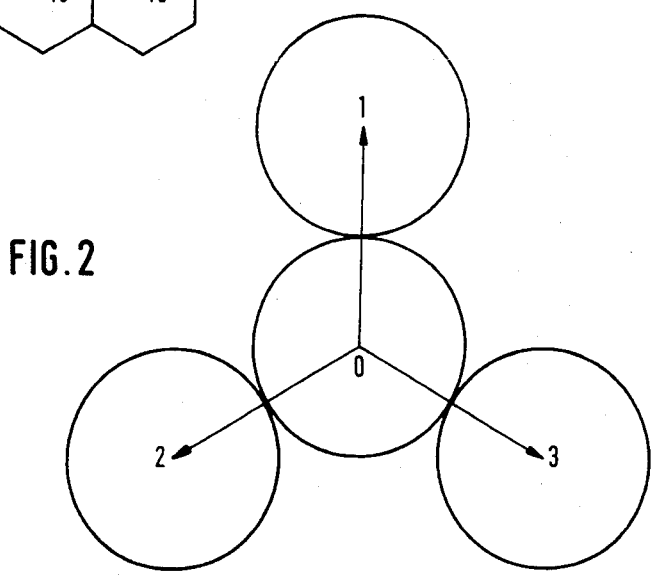
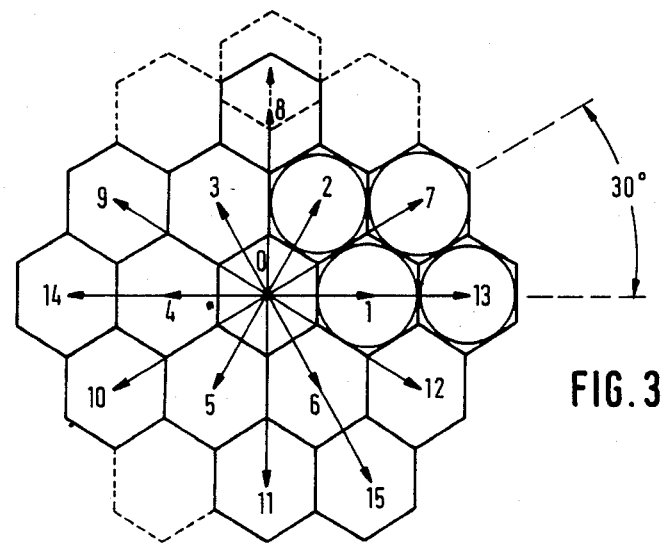
FIG. 3

MULTIPLE AMPLITUDE AND PHASE SHIFT KEYED SIGNAL MODULATION METHOD

BACKGROUND OF THE INVENTION

The present invention relates to a digital modulation method employing digital signals having a word length of k bits (k=1, 2, 3, ...) according to which modulation signals having certain amplitudes and phase positions are associated with the $2^k$ possible bit words, these modulation signals being formed by a combination of three carrier waves which are shifted in phase by 120° relative to one another and have a constant frequency and weighted amplitudes.

Such a digital modulation method is disclosed in U.S. Pat. No. 3,805,191. This patent discloses, in particular, a method for modulating a carrier signal with higher valued digital signals, i.e. with digital signals whose bit word length is greater than 2. The object is there to modulate the carrier signal in such a manner that it is as unsusceptible as possible to interference in the transmission path in order to be able to recover in the receiver the original data signal from the modulated carrier signal without errors.

If the digital signal has a word length of 2 or perhaps even 3 bits, it is sufficient to only phase modulate the carrier signal with a constant amplitude. Pure phase modulation soon reaches its limits since with an increasing number of possible bit words the phase difference between the signals at adjacent phase positions decreases. When such phase difference becomes too small, there easily exists the danger that even a slight fluctuation in phase will cause a particular signal to be evaluated as belonging to the adjacent signal phase.

For that reason, and in order to realize a modulation as insensitive to interference as possible with higher valued data signals, use is made of phase-amplitude modulation, i.e. the signals associated with each bit word have a particular phase and amplitude. The selection of the phase and amplitude differences between different signals should now be made in such a manner that the usual interference occurring during signal transmission, such as noise, phase shifts, oblique amplitude positions, multiple path propagation and the like, will not interfere with the signal amplitude and phases to such an extent as to cause incorrect signal evaluations. The above-mentioned U.S. Pat. No. 3,805,191 discloses a modulation method based on phase-amplitude modulation, which has a greater signal to noise ratio than conventional methods (e.g. quadrature amplitude modulation QAM). In contradistinction to QAM, in which the various signal states are produced by the bit word controlled combination of two 90° phase shifted carrier signals with their amplitudes correspondingly weighted, the method disclosed in U.S. Pat. No. 3,805,191 combines three 120° phase shifted and amplitude weighted carrier oscillations; i.e., according to this method, the signal vectors are selected with respect to their amplitude and phase so that their ends lie in the centers of identically sized, regular hexagons which are arranged in the polar coordinate amplitude-phase plane in a honeycomb pattern without interstices around the vector origin M (see FIG. 1).

It can be seen from the phase plane shown in FIG. 1 that the angles between some pairs of signal vectors, e.g. between vectors 2 and 11 or 5 and 15, etc. are rather small, so that it is easily possible for signals associated with these vectors to be evaluated incorrectly due to phase shifts. With respect to phase shifts, this modulation method is thus still rather subject to interference. Moreover, the irregular angle distribution produced by the vectors in the phase plane is unfavorable for demodulation since the demodulator must be able to precisely recognize several very different phase states. If thus the unequivocal determination of the phase states is made more difficult, the error probability during demodulation is increased.

SUMMARY OF THE INVENTION

It is therefore an object of the present invention to produce a digital modulation signal that is less subject to interference, and is more reliably demodulatable, than prior art signals.

The above and other objects are achieved, according to the present invention, in that only those signals are used as modulation signals whose vectors divide the 360° phase plane into identically sized angle sectors and that in addition a zero signal without level is used as the modulation signal. Such a zero signal can be produced, for example, either by combining all three carrier oscillations of the same amplitude or by transmitting none of the three carrier oscillations.

More specifically, the present invention resides in a multi-phase modulation method in which digital words each having a word length of k data bits control the generation of a modulated carrier in a manner such that each digital word value is associated with a particular amplitude and phase of the modulated carrier, and in which the modulated carrier is formed of a combination of three oscillating signals having identical frequencies, shifted in phase by 120° relative to one another, and each having a selected amplitude, the digital words being associated with the oscillating signals in such a manner that a first group of digital words is represented only by modulated carrier phases which possess equal angular spacings in the 360° phase plane and at least one further digital word is represented by a zero amplitude carrier formed by combining the three oscillating signals each having the identical selected amplitude or by suppressing all three oscillating signals. According to the invention: each digital word has a length of at least 3 bits; there is a plurality of further digital words each represented by a zero amplitude carrier, at least three bits of each further digital word differing from the corresponding at least three bits of each other further digital word; and the method includes modulating the carrier in response to successive bits of each digital word for producing, during the period of each digital word, a first modulated carrier segment representing the digital word and two further modulated carrier segments representing redundant digital words derived from the digital word represented by the first modulated carrier segment and having values which permit error-free determination, during subsequent demodulation, of the digital word represented by the first modulated carrier segment.

Due to the fact that the signal without level is associated with one or, even better, a plurality of bit words, the average power of the modulation signal is reduced compared to those generated according to the above-mentioned methods if all signal states are transmitted with equal frequency. This has been found to be particularly advantageous if the requirement exists for the lowest possible average signal power.

The invention will now be explained in greater detail with the aid of the embodiments that are illustrated in the drawings.

BRIEF DESCRIPTION OF THE DRAWING

FIG. 1 is a diagram of a signal vector distribution in the phase plane for 16 bit words according to the prior art.

FIG. 2 is a similar diagram of the signal vector distribution in the phase plane for four bit words according to a preferred embodiment of the invention.

FIG. 3 shows a similar diagram of a signal vector distribution for 16 bit words likewise according to an embodiment of the invention.

DESCRIPTION OF THE PREFERRED EMBODIMENTS

Figure 4:
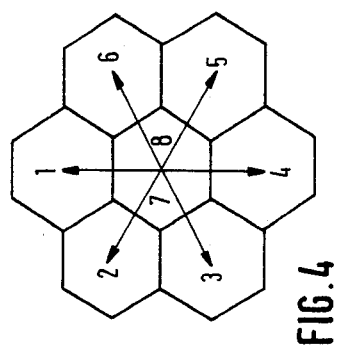
FIG. 4 shows a similar diagram of a signal vector distribution for eight bit words according to the invention with two different bit words being associated with the zero vector.

Reference to FIG. 1 has already been made in connection with the description of the prior art. The regular, identically sized hexagons shown in the phase plane constitute an aid for the construction of the signal vectors. If the vectors 1 to 6 are each made to end in the center of a respective hexagon, the resulting signal-to-noise ratios between the vectors are rather favorable.

FIG. 2 shows a very simple vector system for a data signal having four possible values each represented by a 2-bit word; according to the invention, one such word is associated with the signal 0, which has no amplitude level and of course also no defined phase state, and the remaining three words are associated with signals whose vectors 1, 2 and 3 have identical amplitudes or lengths and differ in phase from one another by 120°. So-called interference, or noise, circles are drawn around the vectors. They define the regions in which an interference voltage vector can rotate around the tips of the signal vectors 0, 1, 2, 3 without falsifying, by superposition of the interference voltage, one signal state into another. This means that if there is signal falsification as a result of noise, phase shifts, oblique amplitude positions and multipath reception in the radio field, the demodulator still correctly recognizes the original signal state as long as the vector tip does not move out of its associated noise circle. The farther apart the noise circles, the lower is the probability that a signal state is falsified to another.

Since in the system shown in FIG. 2 the zero signal is also utilized, which is effected by superposition of the three 120° phase shifted carrier oscillations at identical amplitudes, or by not transmitting any of the three carrier oscillations, the other three signals can move very far apart in phase (i.e. by 120°) thus producing the optimum signal-to-noise ratio between the signals. The signal vectors shown in FIG. 2 have the same lengths.

It is also possible to form three vectors of different lengths from the combination of differently weighted carrier oscillations. This is possible in the extreme case in a three-phase system if with very heavy phase interference, a phase difference of 120° is not sufficient to clearly recognize the signal states in the receiver. The staggered signal amplitudes then furnish a further criterion for differentiation of the signals.

FIG. 3 shows a vector system for a data signal having sixteen possible values each identified by a respective four-bit word. Here again, the zero signal 0 is utilized. However, in this embodiment the zero signal has only one associated bit word. There then results an ideal distribution of the signal vectors in the phase plane if, as in the prior art modulation method of FIG. 1, each vector end is placed in the center of a regular hexagon. The other hexagons are arranged around a center hexagon whose center point coincides with the vector of the zero signal which is simultaneously the point of origin 0 of the vectors 1 through 15.

This hexagon configuration results in the associated vectors dividing the 360° phase plane into identical angle sectors. Each pair of adjacent vectors forms an angle of 30°. Due to the optimal and equidistant phase distances, the associated modulation signals can be demodulated with a very low error probability. If, with very heavy interference, the amplitude spacing between the signals in the most compact hexagon arrangement shown in FIG. 3 should not be sufficient, the hexagons 7, 8, 9, 10, 11, 12, 13, 14 and 15 of the outer ring of hexagons can be displaced farther from the point of origin 0 which is equivalent to a lengthening of the vectors ending in the center points of these hexagons.

The hexagon system conceived as a construction aid can be augmented for further signal states as indicated by the broken line hexagons in FIG. 3.

In order to synchronize the demodulator to a fixed reference phase and to set the gain on the demodulator side, a pulse may be modulated at certain intervals onto a modulation signal of a defined phase. In this embodiment, this is the modulation signal associated with hexagon 8. The associated vector is thus temporarily elongated, as shown in broken lines in FIG. 3.

A simple embodiment employing digital signals composed of three-bit words will be described to show that more than one such word can also be associated with the zero signal. The result is that fewer signal states are required at an amplitude different from zero to represent all bit words. This implies that fewer vectors need be distributed in the 360° phase plane. The phase angles between the vectors can thus be enlarged further. The advantage of the greatest possible phase separation has already been pointed out above.

FIG. 4 shows the phase plane of such an embodiment with the vectors of the modulation signals 1 through 8 for digital signals having a word length of three bits. The table below FIG. 4 shows the association of the eight possible bit words with the modulation signal values 1 to 8. Six vectors lie in the phase plane, i.e. the vectors of the modulation signals 1 through 6 which are each 60° away from their adjacent vectors. The remaining two bit words 000 and 111 are associated with the zero signal value.

In order to detect, during demodulation, which one of the two bit words has been associated with a transmitted zero signal, it is necessary to transmit additional information from which it can be determined whether the bit word 000 or the bit word 111 has been transmitted by the zero signal.

The additional information is furnished by two redundant bit words which are likewise modulated and transmitted together with every modulated bit word of the data signal to be transmitted.

Figure 5:
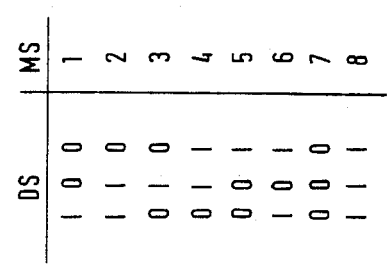
FIG. 5 is a digital signal sequence diagram for the embodiment of FIG. 4 which illustrates the association of the bit words with the modulation signals.
Figure 5:
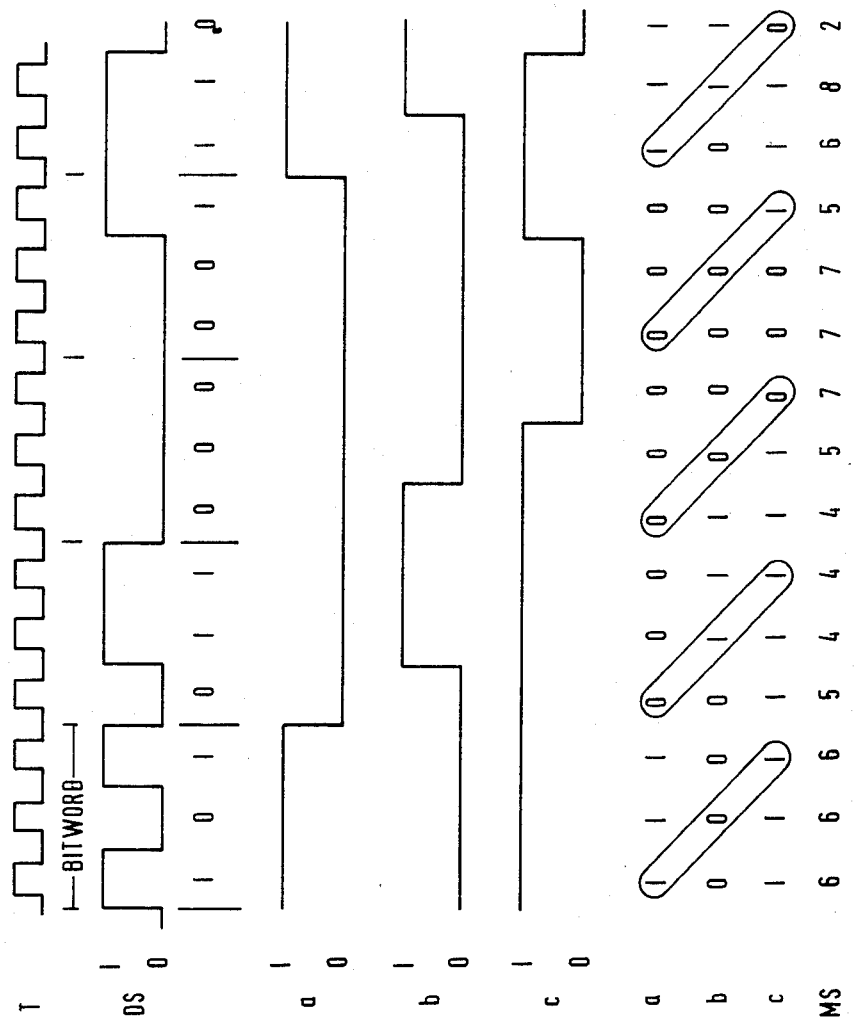

The formation of suitable redundant bit words is shown in the pulse diagram of FIG. 5. The clock pulse signal T for the modulator is shown in the top line. A data signal DS has been selected which can be modulated in any desired manner and which is composed of the sequence of three-bit words 101, 011, 000, 001 and 110. The lines a, b and c stand for the three carrier oscillations phase shifted by 120° relative to one another, the combination of which produces the desired modulation signals. If a 1 is present at a, b or c, it means that the associated carrier oscillation is used to form the modulation signal. If a 0 is present at a, b or c, the associated carrier oscillation has no part in the formation of the resulting modulation signal. The data signal bits are fed serially to influence the modulation signal. In this case, the first bit of a word determines whether the carrier oscillation a (with phase 0°) contributes to the modulation, the second bit determines whether the carrier oscillation b (with phase 120°) contributes to the modulation and the third bit determines whether the carrier oscillation c (with phase 240°) contributes to the modulation. The digital signal DS is fed serially to the modulator, i.e. the values for a, b and c are set successively in time. The table for the values of a, b and c in the lower portion of FIG. 5 clarifies this process. Each row shows the bit values controlling each modulation. The boxed-in bit values are those representing the data signal words. With the first bit of a word, the signal a is brought to the value given by the bit, with the second bit, signal b is set to the corresponding bit value, and with the third bit finally, the signal c is set to the corresponding bit value. At the end of a data signal word, each of a, b and c has the signal state 1 or 0 corresponding to the respective word so that a combination of the three carrier oscillations corresponding to the states of a, b and c produces the modulation signal associated with the data signal word.

It is the general practice to transmit only the final modulation signal associated with a data signal word. This modulation signal may then have a pulse length which corresponds to the time required by a data signal word applied serially to the modulator to set a, b and c to the correct states. However, this period of time is now to be utilized not only for the transmission of the one modulation signal but also for the transmission of two further redundant modulation signals.

The two redundant modulation signals originate from two bit words, with the first bit word differing from the second, and the second bit word differing from the subsequent true data signal word, in any case at one bit position. This is accomplished in that the states of a, b and c remain the same between two changes effected by the data signal. For comparison see the value tables for a, b and c in the lower portion of FIG. 5.

With the aid of these two redundant bit words transmitted as modulation signals, it can be determined in the receiver whether the bit word 000 or the bit word 111 has been associated in the modulator with a transmitted zero signal. If the preceding redundant bit word was 000, 100, 010 or 001, the zero signal was based on the bit word 000 because only the word 000 can be produced by changing the value at only one bit position of each of those redundant bit words. In the same manner the zero signal was assuredly associated with the bit word 111 if the preceding redundant bit word was 111, 011, 101 or 110.

Instead of the preceding redundant bit words, the subsequent redundant bit words can also be utilized for the evaluation of the zero signal. Moreover, it is advisable to use the two redundant bit words for error detection for all other transmitted data signals. Under certain circumstances it is also possible to correct errors by use of the redundant bit words.

It is further possible to code the two redundant bit words in another, more complicated code which permits reliable error detection and correction.

Since, according to the above method, only two further modulation signals need be transmitted in the same period of time which customarily is available only for the transmission of the one modulation signal associated with the data signal, the three modulation signals must be matched with one another in a quite particular manner. Namely, the three modulation signals are transmitted with a mutual phase shift of 120° with respect to their envelope. The envelope of each modulation signal is only the sine or cosine fundamental wave which is obtained by suppression of all harmonics of the otherwise rectangular envelope. With this method there exists the advantage that no greater bandwidth is required for the transmission channel than is necessary for the transmission of a modulation signal having a rectangular envelope of a width which corresponds to the time required for the serial emission of a data signal word to the modulator.

The method described for an embodiment using $2^3 = 8$ bit words can of course also be used for digital signals with higher valued bit words.

Figure 6:
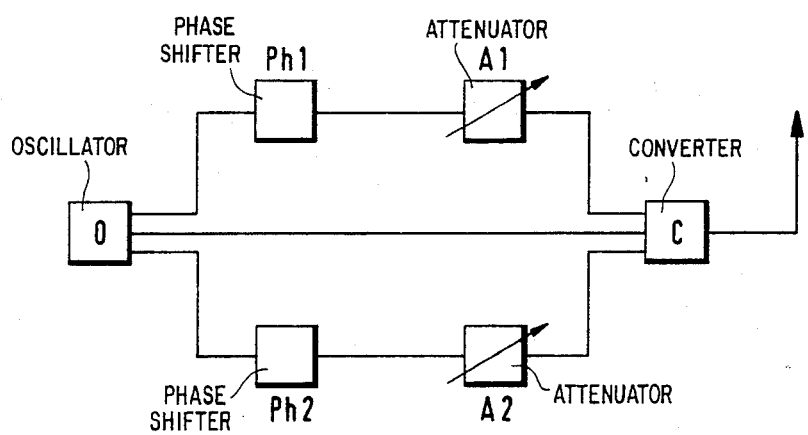
FIG. 6 is a block circuit diagram of a modulator, which can be used for the invention.

FIG. 6 shows a block circuit diagram of a modulator which can be used for the invention. It consists of an oscillator 0 with an output oscillation of for example 70 MHz. The upper branch of this oscillator 0 output leads to a phase shifter Ph1 which gives a relative phase of e.g. −120°. This phase shifter is followed by an attennator A1 for regulation of the amplitude of the branch signal led to a converter C. The lower branch contains a phase shifter Ph2 which gives a relative phase of +120°. It is followed by an attenuator A2 the output of which leads to the mentioned converter C converting the input signals for example to 2 GHz. The middle branch in FIG. 6 is connected directly from the oscillator 0 to the converter C. The output of this converter may be connected with an antenna.

It will be understood that the above description of the present invention is susceptible to various modifications, changes and adaptations and the same are intended to be comprehended within the meaning and range of equivalents of the appended claims.

What is claimed is:

1. In a multi-phase modulation method in which digital words each having a word length of k data bits control the generation of a modulated carrier in a manner such that each digital word value is associated with a particular amplitude and phase of the modulated carrier, and in which the modulated carrier is formed of a combination of three oscillating signals having identical frequencies, shifted in phase by 120° relative to one another, and each having a selected amplitude, the digital words being associated with the oscillating signals in such a manner that a first group of digital words is represented only by modulated carrier phases which possess equal angular spacings in the 360° phase plane and at least one further digital word is represented by a zero amplitude carrier formed by combining the three oscillating signals each having the identical selected amplitude or by suppressing all three oscillating signals, the improvement wherein: each digital word has a length of at least 3 bits; there is a plurality of further digital words each represented by a zero amplitude carrier, at least three bits of each further digital word differing from the corresponding at least three bits of each other further digital word; and said method comprises modulating the carrier in response to successive bits of each digital word for producing, during the period of each digital word, a first modulated carrier segment representing the digital word and two further modulated carrier segments representing redundant digital words derived from the digital word represented by the first modulated carrier segment and having values which permit error-free determination, during subsequent demodulation, of the digital word represented by the first modulated carrier segment.

2. In the method as defined in claim 1, each digital word having a length of 3 bits, there being two of said further digital words constituted by the digital words 000 and 111, the zero amplitude carrier representing the digital word 000 being formed by suppressing the three oscillating signals, and the zero amplitude carrier representing the digital word 111 being formed by causing the three oscillating signals to have equal amplitudes.

3. In the method as defined in claim 1, the first and two further carrier segments having envelopes which are shifted in phase relative to one another by 120°.

4. In the method as defined in claim 3, the envelopes being sinusoidal in form.

* * * * *